No. 880,833. PATENTED MAR. 3, 1908.
F. C. STEVENS.
CAR TRUCK.
APPLICATION FILED NOV. 21, 1907.
2 SHEETS—SHEET 1.
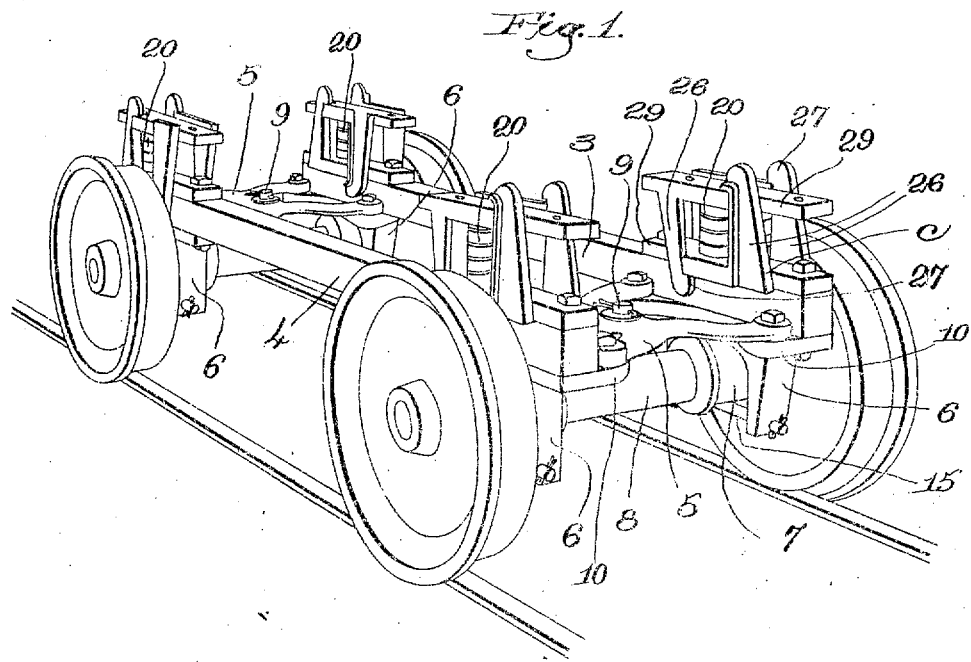
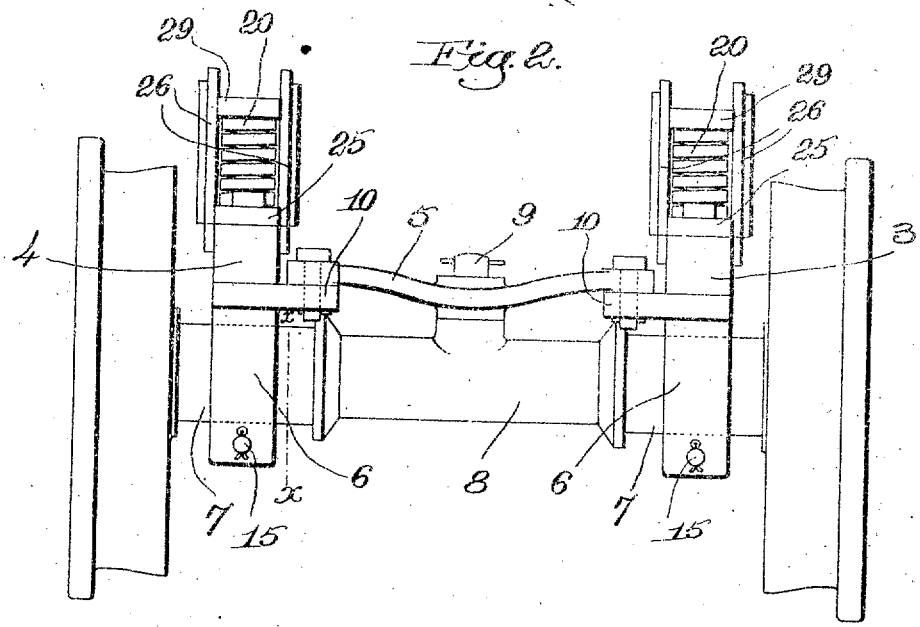

No. 880,833. PATENTED MAR. 3, 1908.
F. C. STEVENS.
CAR TRUCK.
APPLICATION FILED NOV. 21, 1907.
2 SHEETS—SHEET 2.
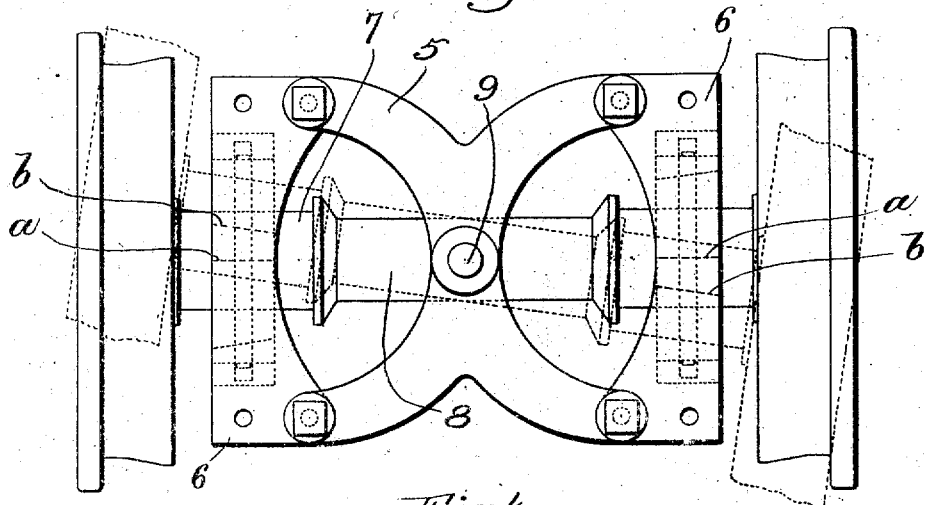
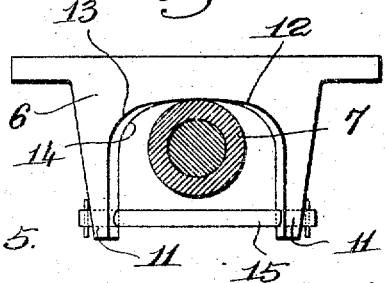
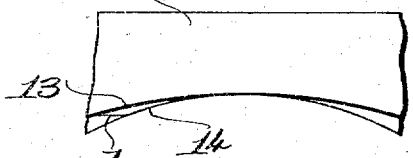
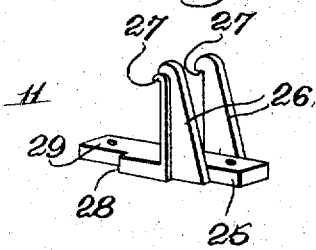
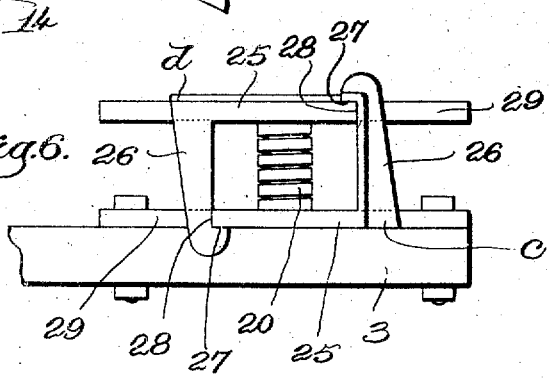
Witnesses.
Thomas J. Drummond
G. P. Gregory
Inventor.
Frank C. Stevens
by Cerely Gregory
Attys.

UNITED STATES PATENT OFFICE.

FRANK C. STEVENS, OF NORTH ANDOVER, MASSACHUSETTS, ASSIGNOR TO DAVIS & FURBER MACHINE COMPANY, OF NORTH ANDOVER, MASSACHUSETTS, A CORPORATION OF MASSACHUSETTS.

CAR-TRUCK.

No. 880,833.      Specification of Letters Patent.      Patented March 3, 1908.

Application filed November 21, 1907. Serial No. 403,107.

*To all whom it may concern:*

Be it known that I, FRANK C. STEVENS, a citizen of the United States, and a resident of North Andover, in the county of Essex and State of Massachusetts, have invented an Improvement in Car-Trucks, of which the following description, in connection with the accompanying drawing, is a specification, like letters on the drawing representing like parts.

This invention relates to car trucks and especially to industrial car trucks, that is, car trucks for cars such as are extensively used in large manufacturing establishments for transferring articles from one part of the yard to another.

One of the objects of the invention is to provide a novel form of truck which permits the axles to freely turn into an angular position when the car is passing over curved portions of the track, and which provides a construction whereby the axles are automatically brought back to their central or normal position after the curve is passed and without having to be forced back to this position by the rails of the track.

Another object of the invention is to improve generally car trucks of this type so as to simplify and cheapen the cost of manufacture thereof.

I will first describe one embodiment of my invention and then point out the novel features thereof in the appended claims.

In the drawings, Figure 1 is a perspective view of a car truck embodying my invention, said view showing the car body removed; Fig. 2 is an end view of the car truck shown in Fig. 1; Fig. 3 is a plan view of one end of the car truck showing in dotted lines the axle turned into an angular position; Fig. 4 is a section on the line $x$—$x$, Fig. 2, looking to the left; Fig. 5 is an enlarged view showing the character of the curved bearing surface on the bearing member; Fig. 6 is a detail of the truck showing the way in which the springs are held in place; Fig. 7 is a perspective view of one of the spring-retaining members.

The car truck herein shown comprises the two side sills 3 and 4 which are connected at each end by a cross frame 5. Each sill has secured to each end a bearing member 6 which rests on the axle, and I preferably provide each axle at each end with a sleeve 7 loosely mounted thereon, which sleeve has engagement with the bearing member 6.

The sleeves 7 on each axle are shown as being spaced and held in their proper position by a central sleeve 8 which is also loosely mounted on the axle, and if desired said central sleeve may have extending therefrom a pivot pin 9 which extends through and is pivotally connected to the cross frame 5.

In the present embodiment of my invention the sills 3 and 4 rest on and are secured to the bearing members 6, and said bearing members have the laterally extending ears 10 to which the frames 5 are secured.

The bearing members 6 are yoke-shaped, they each being provided with downwardly extending arms 11 which are preferably of a length to extend below the sleeve 7. Each bearing member is provided with a bearing surface 12 which rests on the corresponding sleeve 7, and these bearing surfaces are of a special shape which will permit the axles to turn relative to the truck when the car is passing over the curved portions of the track, and which will operate automatically to bring the axles back to their central position after the curve has been passed.

Each axle and consequently each sleeve 7 is always maintained in a horizontal position, and the bearing surfaces 12 are so designed that in every position of the axle the sleeve 7 will have contact therewith from one edge to the other thereof in a line of contact which occupies a horizontal plane.

When each axle is in its normal position such as it would assume when the car is running over a straight track, and such as shown in full lines Fig. 3, the line of contact between each sleeve 7 and its bearing surface 12 will be that illustrated by the dotted line $a$, Fig. 3. When however the axle is swung into the dotted line position Fig. 3, the line of contact between each sleeve 7 and the bearing surface 12 is shifted into the position indicated by the dotted lines $b$. To secure the results aimed at therefore requires that the curved surface 12 of each bearing member 6 should be so designed that both the lines $a$ and $b$, in Fig. 3, should be in horizontal planes.

I find that by making each curved surface 12 a conical surface corresponding to that of a cone having its apex at the point where the lines $a$ and $b$ would meet if extended a curve of the desired contour can be produced. With such a construction it will be seen that as the axles turn the sleeves 7 are rolled over the bearing surfaces 12 more or less dependent on the amount which the axle is turned, and that in so doing the bearing members 6 and the car truck are raised slightly owing to the concavity of the curved surfaces 12. During the rolling contact between the sleeves 7 and the bearing surfaces 12 however each sleeve maintains at all times a line of contact with the corresponding bearing surface, which line of contact extends from one curved edge 13 to the other curved edge 14 of said bearing surface. As soon as the car passes off from the curved track onto a straight track the weight of the truck and the load thereon tends to cause the sleeves 7 to roll back to their central position, as indicated in Fig. 4, and thus with my improved construction the axles are automatically centered as soon as the car leaves the curved portion of the track.

While I have shown each sleeve 8 as having the pivotal pin 9 extending through the frame 5 to form an axis or pivot about which said axle turns yet the presence of these pivotal pins is not necessary because the special curved shape of the bearing surfaces 12 will operate automatically to maintain the axles in their proper position.

I may if desired connect the two arms 11 of each bearing member by a pin or rod 15 which extends beneath the axle although this is not essential to the invention. The advantage of using these pins is that they prevent the axle from dropping out from the bearing members in case the car should be tipped up at one end.

The sills 3 and 4 sustain springs 20 on which the car body (not shown) is yieldingly supported. Each spring is confined between two similar spring-retaining members $c$ and $b$ of special shape, one of which is secured to the sill and the other of which is to be secured to the body.

As stated above the two spring-retaining members of any pair are similar, and either one therefore may be secured to the sill.

The form of each spring-retaining member is best seen from Figs. 6 and 7. Each comprises a base piece 25 and two arms or jaws 26 extending therefrom, each arm being formed at its end with a nose or shoulder 27. The base of each spring-retaining member is also provided with a shoulder 28 at each side, and the portion 29 beyond the shoulders 28 is of the same width as the space between the jaws or arms 26. In using these spring-retaining members one member of a pair of members, for instance the member $c$, is secured to the top of the sill with the arms 26 thereof extending upwardly and the other member $d$ of the pair is brought into operative relation to the member $c$ by placing the ends 29 of each member between the jaws 26 of the other member and hooking the noses 27 of each member over the shoulders 28 of the other member, the spring 20 having been previously placed between the two base pieces 25, as shown in Fig. 6.

Where the two spring-retaining members $c$ and $d$ of any pair are thus connected together the spring will be held in its proper position thereby and the noses 27 will limit the expanding movement of the spring while the compression of the spring due to a loaded truck is permitted by the portions 29 of each member playing between the arms 26 of the other member.

In order to prevent the two members of any pair from separating by movement longitudinally of said truck I propose to arrange the pairs of members $c$ and $d$ reversely at each end of each sill, as best shown in Fig. 1 wherein the member $c$ at one end of the truck is arranged with the arm 26 at the right hand end thereof while the member $c$ at the opposite end of the truck is arranged with the arms 26 at the left hand end thereof.

The car body is to be supported on the base pieces of the upper members of each pair. In this way the two pairs of spring-retaining members at each side of the truck act in conjunction with each other to prevent the body from moving longitudinally of the truck.

I have not attempted to describe all embodiments of my invention but have merely selected for illustration one embodiment which is illustrative of the principle of the invention.

Having described my invention what I claim as new and desire to secure by Letters-Patent is:—

1. In a car truck, the combination with an axle extending from one side to the other of the truck, of a truck frame having a bearing member for each end of the axle, each bearing member having a bearing surface formed on a curve of greater radius than that of the axle.

2. In a car truck, the combination with an axle extending from one side to the other of the truck and having a cylindrical bearing portion adjacent each end, of a truck frame having a bearing member adapted to engage each bearing portion of the axle, each bearing member having a bearing surface formed on a curve of greater radius than that of the bearing portion of the axle.

3. In a car truck, the combination with an axle having at each end a cylindrical bearing portion, of a truck frame having a bearing member adapted to rest on and engage each bearing portion of the axle, each bearing member having a conical bearing surface to engage the cylindrical portion of the axle.

4. In a car truck, the combination with a truck frame, of an axle centrally pivoted thereto and having a cylindrical bearing portion adjacent each end, said truck frame having a bearing member for each bearing portion of the axle, each bearing member having a bearing surface of conical shape formed on a curve of much greater radius than that of the bearing portion of the axle.

5. In a car truck, the combination with an axle, of cylindrical sleeves loosely mounted on each end thereof, a truck frame having a yoke-shaped bearing member for engagement with each sleeve, each bearing member having a concavely curved bearing surface for the sleeve, which bearing surface is of greater radius than that of the sleeve.

6. In a car truck, the combination with an axle, of cylindrical sleeves loosely mounted on each end thereof, a truck frame having a yoke-shaped bearing member for engagement with each sleeve, each bearing member having a conical bearing surface for engagement with the corresponding sleeve.

7. In a car truck, two similar spring-retaining members each having a base piece and parallel jaws extending therefrom, the jaws of each member having means to engage the base of the other member in combination with a spring retained between said members.

8. In a car truck, two similar spring-retaining members each comprising a base piece and jaws extending therefrom and each provided with a nose 27, the base of one member adapted to be engaged by the nose of the other member in combination with a spring retained between the base of said members.

9. In a car truck two similar spring-retaining members each comprising a base 25 having arms 26 extending therefrom and lateral shoulders 28, each arm having a nose 27, the nose of the arms of one member being adapted to engage the shoulders 28 of the other member in combination with a spring confined between said members.

In testimony whereof I have signed my name to this specification, in the presence of two subscribing witnesses.

FRANK C. STEVENS.

Witnesses:
WILLIAM D. RUNDLETT,
ALFRED C. JENSEN.